(12) United States Patent
Iba

(10) Patent No.: US 7,664,782 B2
(45) Date of Patent: Feb. 16, 2010

(54) ASSOCIATING A SET OF RELATED WEB SERVICES HAVING DIFFERENT INPUT DATA STRUCTURES WITH A COMMON IDENTIFICATION NAME

(75) Inventor: Yoshihito Iba, Machida (JP)

(73) Assignee: International Business Machines Corporation, Armonk, NY (US)

( * ) Notice: Subject to any disclaimer, the term of this patent is extended or adjusted under 35 U.S.C. 154(b) by 133 days.

(21) Appl. No.: 11/869,795

(22) Filed: Oct. 10, 2007

(65) Prior Publication Data

US 2008/0091729 A1    Apr. 17, 2008

(30) Foreign Application Priority Data

Oct. 17, 2006    (JP) .............................. 2006-283156

(51) Int. Cl.
*G06F 17/30* (2006.01)

(52) U.S. Cl. ........................................ 707/104.1; 707/3

(58) Field of Classification Search ........................ None
See application file for complete search history.

(56) References Cited

FOREIGN PATENT DOCUMENTS

| | | |
|---|---|---|
| JP | 2005-174120 | 6/2005 |
| JP | 2005-346408 | 12/2005 |
| JP | 2007-11470 | 1/2007 |

OTHER PUBLICATIONS

Takashi Okamoto, Performance Improvement Technique of SOAP Communication Processing using Differential Analysis of XML Document, collected paper of Computer System Symposium, Information Processing Society of Japan, Nov. 15, 2004, vol. 2004, No. 13, pp. 45 to 54.

Minoru Yoshida, Let's Learn Latest XML & Java Technologies!—Web Service for "Serious" Learners, The 1st Web Service Core Technology, Java World, IDG Japan, Inc., Nov. 1, 2003, vol. 7, No. 11, pp. 147 to 155.

Tatsuya Baba, Evaluation of Protocol and Policy-Based Intrusion Detection System in Real Environment, pp. 33 to 38, Tokyo, Japan, Jul. 19, 2002.

*Primary Examiner*—Neveen Abel Jalil
*Assistant Examiner*—Son T Hoang
(74) *Attorney, Agent, or Firm*—Joseph Bracken; Shimokaji & Associates P.C.

(57) ABSTRACT

A device overloading a web service identification name so that multiple services with a common name can be stored in a Web service directory is disclosed. Each of the services identified by the common name can have a different and unique (for the set of commonly named services) structure for input data. The data structure of the input data can be used to discern which of the set of commonly name Web services a requestor desires.

4 Claims, 12 Drawing Sheets

```
 1: <wsdl:types>
 2:   <schema.....>
 3:     <element name="submit">
 4:       <complexType>
 5:         <sequence>
 6:           <element name="fixedParameter" type="xsd:string"/>
 7:           <xsd:any/>
 8:         </sequence>
 9:       </complexType>
10:     </element>
11:     <element name="submitResponse">
12:       <complexType>
13:         <sequence>
14:           <element name="submitReturn" type="xsd:string"/>
15:         </sequence>
16:       </complexType>
17:     </element>
18:   </schema>
19: </wsdl:types>
```

FIG. 7

| INTERFACE ID | INDIVIDUAL DEFINITION DATA |
|---|---|
| 1 | TEST.wsdl |
| 2 | DEPARTMENT_SETTLEMENT.wsdl |
| 3 | GENERAL_AFFAIRS_SETTLEMENT.wsdl |
| ⋮ | ⋮ |

```
 1: <wsdl:types>
 2:   <schema.....>
 3:     <element name="submit">
 4:       <complexType>
 5:         <sequence>
 6:           <element name="fixedParameter" type="xsd:string"/>
 7:           <element name="variableParameter1" type="xsd:string"/>
 8:           <element name="variableParameter2" type="xsd:string"/>
 9:         </sequence>
10:       </complexType>
11:     </element>
12:     <element name="submitResponse">
13:       <complexType>
14:         <sequence>
15:           <element name="submitReturn" type="xsd:string"/>
16:         </sequence>
17:       </complexType>
18:     </element>
19:   </schema>
20: </wsdl:types>
```

| NO | FIELD NAME | COMMENT | TYPE | CONTAINER TYPE | DEFAULT ATTRIBUTE | INCLUDE IN WSDL |
|---|---|---|---|---|---|---|
| 1 | User Id | APPLICANT ID | TEXT | STANDARD | EDITABLE | YES |
| 2 | EmpNumber | EMPLOYEE ID | TEXT | STANDARD | EDITABLE | YES |
| 3 | UserName | APPLICANT NAME | TEXT | STANDARD | EDITABLE | YES |
| 4 | DeptName | ORGANIZATION NAME | TEXT | STANDARD | EDITABLE | YES |
| 5 | Manager | IMMEDIATE MANAGER | TEXT | STANDARD | EDITABLE | YES |
| 6 | MailAddress | APPLICANT EMAIL ADDRESS | TEXT | STANDARD | EDITABLE | YES |
| 7 | InDate | START DATE | DATE | STANDARD | EDITABLE | YES |
| 8 | OutDate | END DATE | DATE | STANDARD | EDITABLE | YES |
| 9 | VacationDays | NUMBER OF DAYS | NUMERIC VALUE | STANDARD | EDITABLE | YES |
| 10 | TelephoneNumber | EMERGENCY CONTACT NUMBER | TEXT | STANDARD | EDITABLE | YES |
| 11 | Note | REMARK | TEXT | STANDARD | EDITABLE | YES |
| 12 | Reason | AFTER-THE-FACT REASON | TEXT | STANDARD | EDITABLE | NO |
| 13 | NowTime | CURRENT TIME | TEXT | STANDARD | EDITABLE | NO |
| 14 | ArrayField | | TEXT | ARRAY | EDITABLE | NO |

ASSOCIATING A SET OF RELATED WEB SERVICES HAVING DIFFERENT INPUT DATA STRUCTURES WITH A COMMON IDENTIFICATION NAME

CROSS-REFERENCE TO RELATED APPLICATIONS

This application claims the benefit of Japanese Patent Application No. 2006-283156 filed 17 Oct. 2006 and which is hereby incorporated by reference.

BACKGROUND

1. Field of the Invention

The present invention relates Web services and, more particularly, to permitting Web services to be "overloaded" by allowing a set of related Web services having different input data structures to be associated with a common identification name.

2. Description of the Related Art

Web Services Description Language (WSDL) is a language for describing Web services such as services registered with a Universal Description, Discovery and Integration (UDDI) directory. Providers of Web services can provide interface specifications for interacting with a Web service, when they register it with a directory via a WSDL formatted message. Requestors desiring the Web service can generate a message compliant with the disclosed data structure of the Web service, which is conveyed to the provider.

The provider can determine whether the received message is compliant with the interface specification based on whether each element in the message matches the corresponding element in the data written in WSDL. If the message is compliant with the specification, the service is appropriately processed. Otherwise, the message is rejected. It is possible for a requester to automatically generate application programs for requesting services on the basis of the definition data contained in a Web services directory.

It should be noted that messages used for requesting Web services can contain a Uniform Resource Identifier (URI) for identifying a service providing device, an identification name of a service to be requested, and input data to be fed to processing of the service. Definition data written in WSDL defines interfaces of Web services as combinations of such a URI, an identification name, and a data structure of the input data. A Web service request message uniquely identifies a Web services using the URI and the service identification name. It is currently impossible to associate multiple different Web services in a Web service directory with a common identification name, since it can result in a conflict when attempting to access the Web service.

SUMMARY OF THE INVENTION

The present invention discloses a solution for overloading a Web service identification name so that multiple services with a common name can be stored in a Web service directory. Each of the services identified by the common name can have a different and unique (for the set of commonly named services) structure for input data. The data structure of the input data can be used to discern which of the set of commonly named Web services a requester desires.

Overloading a Web service identification name can be useful in many circumstances, where a many similar services are provided. For example, multiple different forms used within an application can be implemented as separate Web services. Content of the services "submit" is common regardless of the kinds of application forms being used, although structures of input data can differ for each kind of application form. Accordingly, managing these services by attaching the common identification name and performing different operations in accordance with structures of input data can make it easier to maintain and manage programs for processing the services. Further, using a common name for a set of Web services has a high affinity for known program languages that provide a method overloading function, which makes using a common name for a set of "overloaded" Web services natural for programmers and users.

The present invention can be implemented in accordance with numerous aspects consistent with material presented herein. For example, one aspect of the present invention can include a method for handling Web services. The method can establish a multiple Web services in a business directory, where each of the Web services use input data having different data structures, and wherein each of the Web services have a common identification name. A service request requesting one of the multiple Web services can be received, wherein said service request message requests a Web service having the common identification name and having a set of input parameters. The set of input parameters can be compared against the different data structures of the Web services. When the set matches for one of the Web services, requirements specified for the matching Web service can be validated against data specified by the service request message. When validation is successful actions to provide the matching Web service in accordance with details specified within the service request message can be initiated.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, any other recording medium, or can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

FIG. 10 shows an example of an input screen displayed by an input receiver.

DETAILED DESCRIPTION OF THE INVENTION

Figure 1:
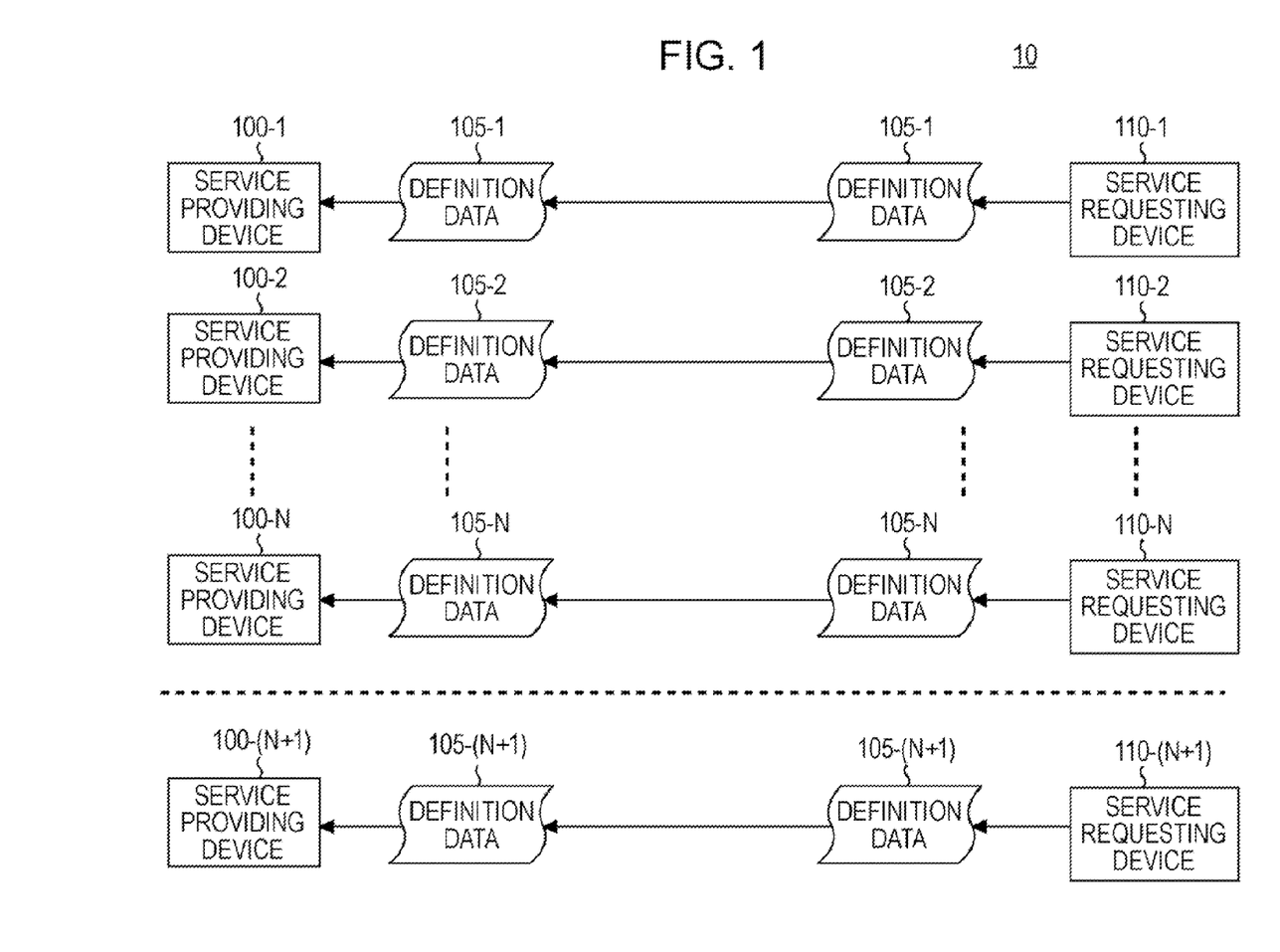
FIG. 1 shows an overview of a configuration of an information system.

FIG. 1 shows an overview of a configuration of an information system 10. The information system 10 includes service providing devices 100-1 to 100-N and service requesting devices 110-1 to 110-N corresponding to the service providing devices 100-1 to 100-N, respectively. Each of the service providing devices 100-1 to 100-N provides a similar service on the basis of input data having a data structure difference from each other. For example, all the service providing devices 100-1 to 100-N accept submission of application form data used in workflow management. However, each of the service providing devices 100-1 to 100-N covers processing of different kinds of application forms.

The service providing devices 100-1 to 100-N store corresponding definition data 105-1 to 105-N, respectively. The definition data 105-1 to 105-N is written in, for example, WSDL. Upon receiving a service request message from the corresponding service requesting device 110, each of the service providing devices 100-1 to 100-N validates whether or not a data structure of the service request message satisfies a specification. This validation is performed on the basis of whether or not each element in the corresponding definition data 105 matches the corresponding element in the service request message. FIG. 1 schematically shows the validation using the definition data 105 by arranging the definition data 105 adjacent to the service providing device 100.

In addition, the definition data 105 is disclosed to the corresponding service requesting device 110. Each of the service requesting devices 110-1 to 110-N obtains the corresponding definition data 105 from the service providing device 100, and stores the definition data 105 therein. Each user of the service requesting devices 110-1 to 110-N creates an application program for requesting a service so that the request message is compliant with the specification while browsing the obtained definition data 105. The user then runs the application program in the service requesting device 110. Alternatively, each of the service requesting devices 110-1 to 110-N may automatically create an application program for requesting a service with software that automatically creates an application program based on the definition data.

Accordingly, a plurality of service providing devices and a plurality of pieces of definition data may be installed to provide similar kinds of services that use input data in different structures. However, this configuration requires service providing devices in proportion to kinds of data structures of input data. For example, a service providing device 100-(N+1) has to be newly added after providing definition data 105-(N+1) as definition data corresponding thereto in order to add input data having a different data structure. The addition of the service providing device 100-(N+1) requires installment of a new device, or requires modification of a configuration of a Web page and new development of an application program for processing the service even if the device is not additionally installed, which is troublesome.

Figure 2:
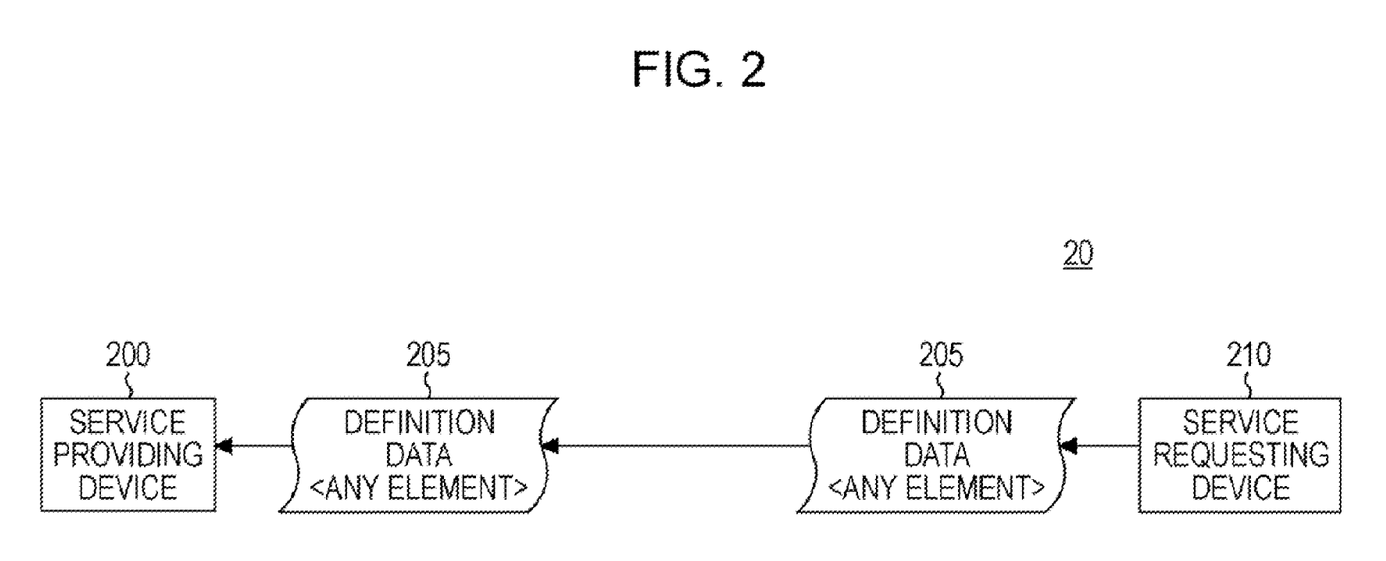
FIG. 2 shows an overview of a configuration of an information system.

FIG. 2 shows an overview of a configuration of an information system 20. The information system 20 includes a service providing device 200 and a service requesting device 210. Even if a service request message contains any of a plurality of pieces of input data in a different data structure, the service providing device 200 sorts operations in accordance with the data structure, and selectively processes an appropriate service. The service providing device 200 also stores definition data 205. As in the case shown in FIG. 1, the definition data 205 is used in validation of whether or not the service request message satisfies a specification.

The definition data 205 includes an ANY element that matches any input data in different data structures. More specifically, the service providing device 200 determines whether the specification to be commonly met regardless of the data structure of the input data is satisfied on the basis of the definition data 205. On the other hand, the service providing device 200 does not determine whether the input data contained in the service request message satisfies the specification on the basis of the definition data 205. On the condition that data structure other than that of the input data satisfies the specification, the service providing device 200 performs an operation based on the input data.

The service requesting device 210 is informed of the definition data 205. The definition data 205 is used in development of application programs in the service requesting device 210. However, since the definition data 205 contains the ANY element for the input data, automatic creation of an application program for requesting a service may be limited. More specifically, after fully understanding that sorting of operations is performed in accordance with data structures in the service providing device 200, a program developer has to create an appropriate application program suitable for the operation. For this reason, the definition data 205, which is originally used for defining interfaces, does not play its role. As a result, it becomes difficult to accurately defining specifications of programs, and it may take a lot of efforts and costs for maintenance and management or improvement of the programs.

Figure 3:
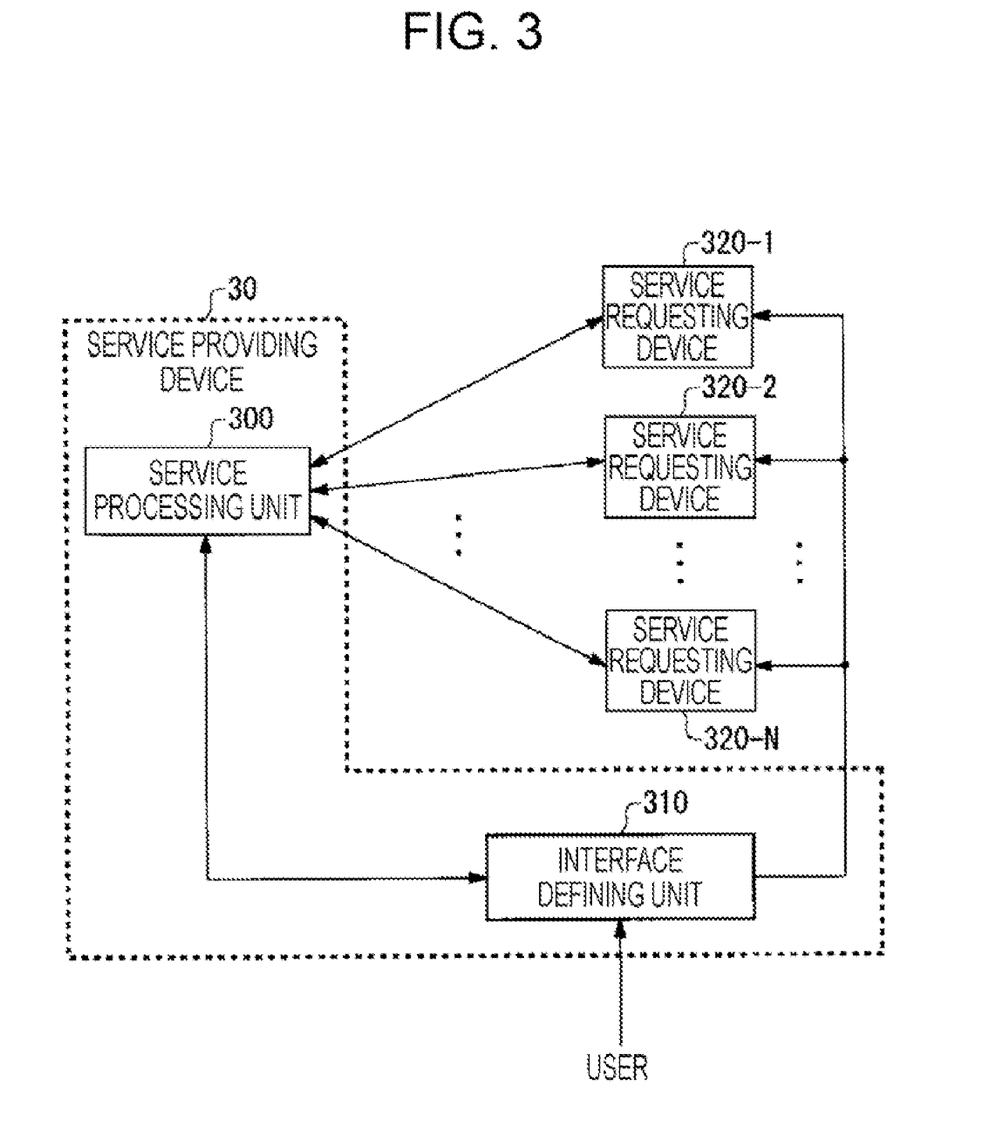
FIG. 3 shows a functional configuration of a service providing device.

On the other hand, a service providing device 30 shown below clearly informs service requesting devices of interface definitions. At the same time, input data having a plurality of different data structures can be processed by one service providing device 30. The service providing device 30 will be described more specifically below.

FIG. 3 shows a functional configuration of the service providing device 30. The service providing device 30 includes a service processing unit 300 and an interface defining unit 310. The service providing device 30 is designed to process services in response to requests from each of service requesting devices 320-1 to 320-N. The service processing unit 300 is virtually assigned to a location on a Web system. That is, the service processing unit 300 is managed, in an identifiable manner, from the outside using a URI (Uniform Resource Identifier). The service processing unit 300 receives a service request message from one of the service requesting devices 320-1 to 320-N (for example, the service requesting device 320-1). The service processing unit 300 then validates whether or not the service request message satisfies the specification that has to be met to request the service processable by the service processing unit 300. This validation is performed on the basis of common definition data and individual definition data. The common definition data defines the specification to be commonly satisfied regardless of the data structure of the input data, whereas the individual definition data allows individual validation of whether the data structure of the input data satisfies the specification. If the specifications are satisfied, the service processing unit 300 performs processing of the service, and returns a processing result to the service requesting device 320-1.

The interface defining unit 310 accepts input of a new specification regarding a data structure of input data from a user. The interface defining unit 310 generates individual definition data on the basis of this specification, and stores the generated individual definition data in the service processing unit 300. This allows the service processing unit 300 to verify the service request message on the basis of this individual definition data. In addition, the interface defining unit 310 informs the service requesting devices 320-1 to 320-N of the generated individual definition data. This allows each of the service requesting devices 320-1 to 320-N to generate a service request message compliant with the individual definition data, and to send the generated service request message to the service processing unit 300.

Figure 4:
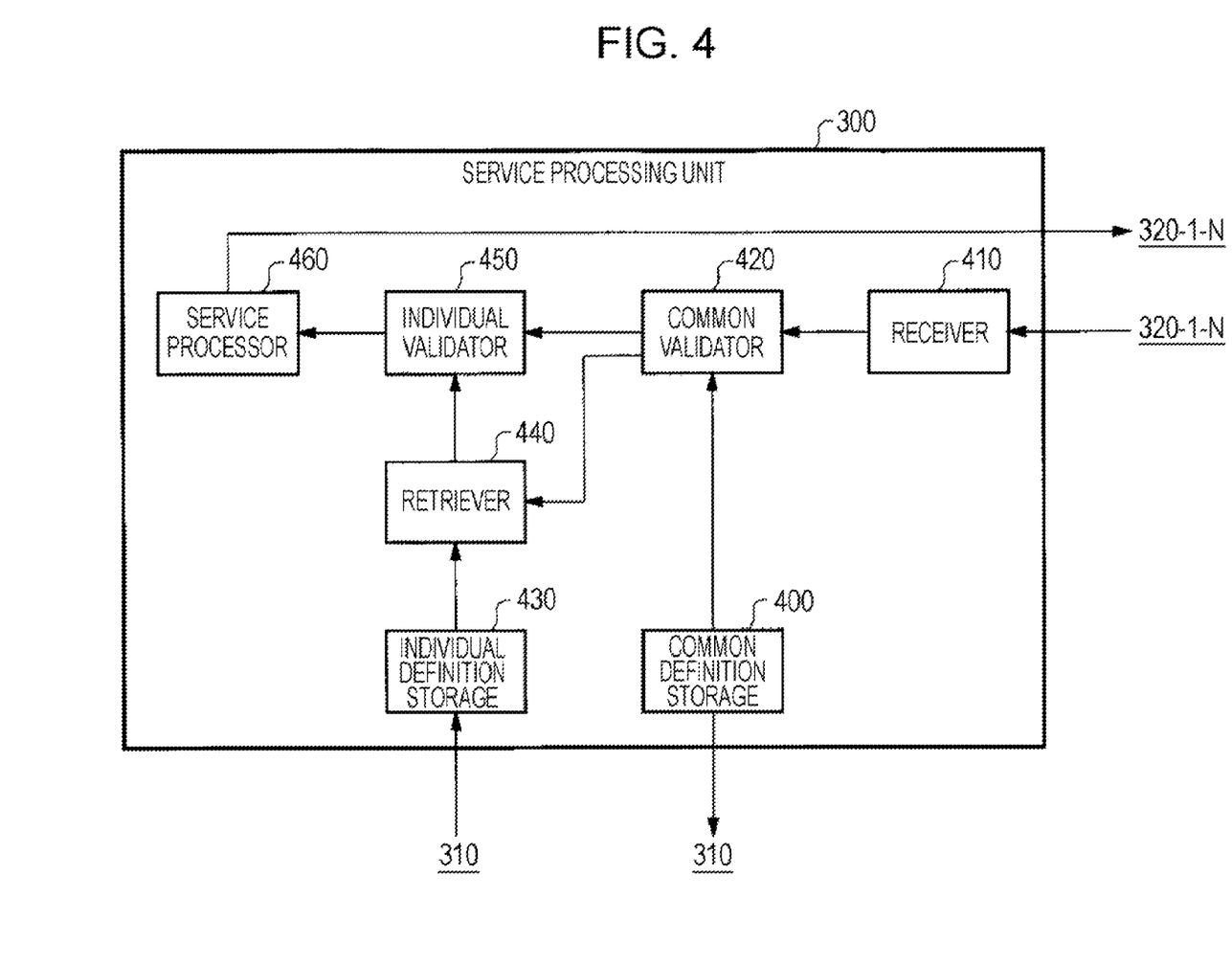
FIG. 4 shows a functional configuration of a service processing unit.

FIG. 4 shows a functional configuration of the service processing unit 300. The service processing unit 300 has a common definition storage 400, a receiver 410, a common validator 420, an individual definition storage 430, a retriever 440, an individual validator 450, and a service processor 460. The service processing unit 300 provides Web services to the service requesting devices 320-1 to 320-N. Each of these units is realized by operations of a central processing unit (CPU) 1000 and a random access memory (RAM) 1020, which will be described later. Functions of each of these units will be described below for an example in which the service processing unit 300 processes the service after receiving a service request from the service requesting device 320-1.

The common definition storage 400 prestores common definition data that defines specifications that data structures of received service request messages should commonly satisfy regardless of the data structures of the input data contained in the messages. The common definition data may be written in, for example, WSDL (Web Services Description Language). This common definition data contains an element of ANY data type or an "ANY" element in XML (eXtensible Markup Language). The ANY type element or the ANY element matches any of a plurality of pieces of input data in different data structures. With this configuration, whether a part excluding the input data of the service request message satisfies the specification can be determined.

The receiver 410 receives a service request message, including the input data and an interface ID allowing identification of a data structure of the input data as elements, from the service requesting device 320-1 using a communication interface (I/F) 1030 described later. This service request message is, for example, a SOAP (Simple Object Access Protocol) message containing an interface ID as an element. This interface ID may be provided by an application program for requesting a service that operates in the service requesting device 320-1 as an attribute value of a predetermined tag in the SOAP message. Alternatively, this interface ID may be a name of nemespace set in the SOAP message.

The common validator 420 reads out common definition data from the common definition storage 400. The common validator 420 then validates, through an operation of the CPU 1000, whether or not the received service request message satisfies the specification on the basis of whether or not each element in the received service request message matches the corresponding element in the common definition data. For example, since the ANY element in the common definition data matches the input data in any data structure, the service request massage satisfies the common specification even if it contains the input data in any data structure. However, if each element in a part excluding the input data does not match the corresponding element included in the common definition data, the service request message does not satisfy the specification. For example, this validation determination may be realized as WSDL validation processing using an XML schema.

The individual definition storage 430 prestores, in association with interface IDs, individual definition data that defines specifications for data structures identified by the interface IDs. The individual definition data defines specifications for data structures that the input data matching the ANY element in the common definition data should satisfy. In addition, each individual definition data may be generated by replacing the element of the ANY data type or the ANY element included in the common definition data with a plurality of elements matching to the input data having different data types or different identification information.

The retriever 440 retrieves and reads out, through an operation of the CPU, the individual definition data corresponding to the interface ID included in the received service request message from the individual definition storage 430. On the condition that each element of the service request message matches the corresponding element of the retrieved individual definition data, the individual validator 450 then determines that the service request message satisfies the specification through an operation of the CPU 1000. This determination may also be realized as WSDL validation processing using an XML schema.

If each element in the service request message matches the corresponding element in the common definition data and in the individual definition data, the service processor 460 performs processing of the service corresponding to the data structure of the input data contained in the service request message through an operation of the CPU 1000.

Figure 5:
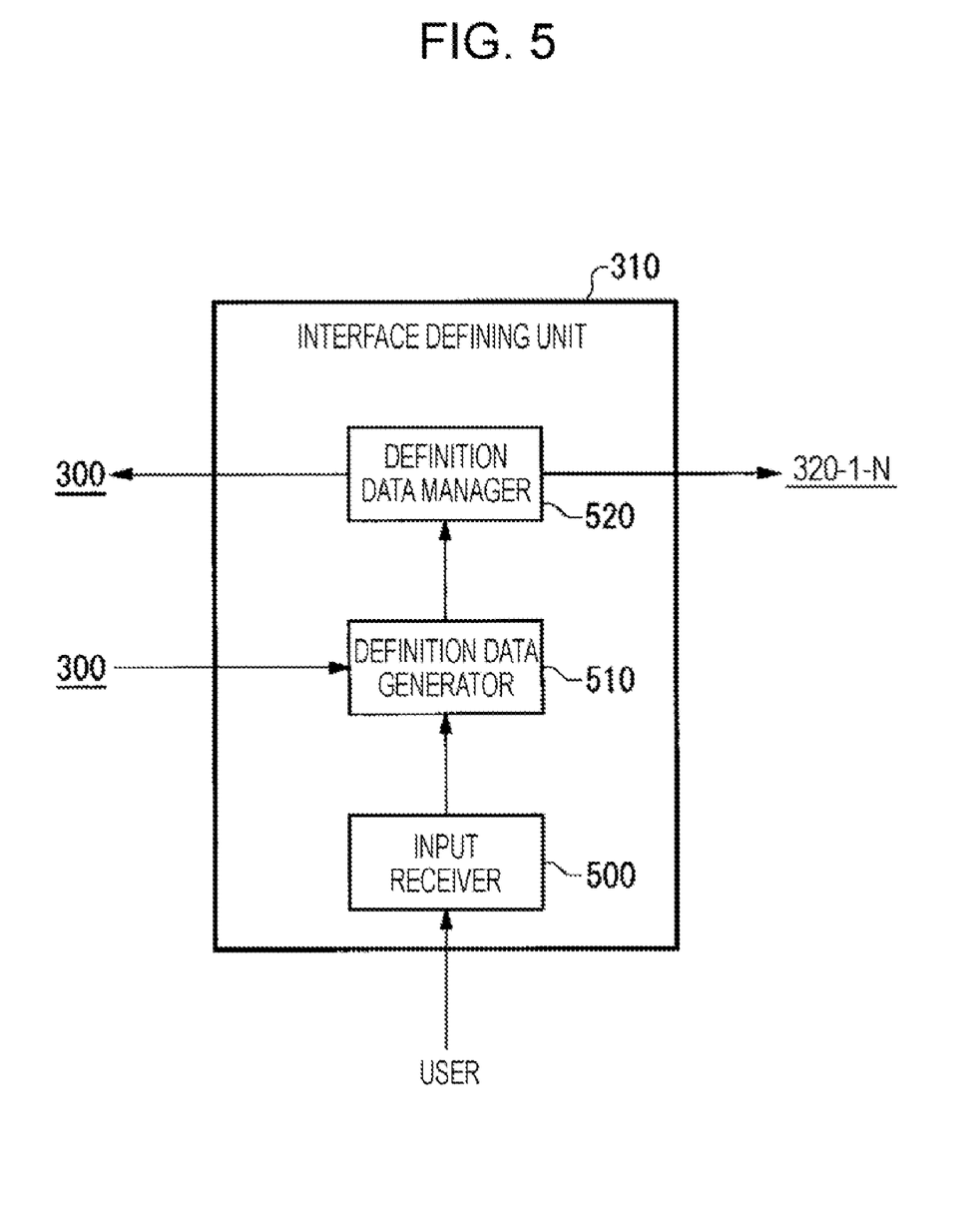
FIG. 5 shows a functional configuration of an interface defining unit.

FIG. 5 shows a functional configuration of the interface defining unit 310. The interface defining unit 310 has an input receiver 500, a definition data generator 510, and a definition data manager 520. The input receiver 500 receives, for each input item included in the input data for processing of the service, input of an item name of the input item and a data type of the input item from a user through an input device, such as a keyboard or a pointing device. For example, in a case where a service for accepting submission of application forms used in workflow management is provided, the data written in the application form corresponds to the input data, and each item included in the application form corresponds to the input item of the input data. Numerical values or characters may be input to the items of the application form in accordance with characteristics of the items. Such data characteristics correspond to data types. That is, a user has only to input an item name of each item included in the application form, a data type, and other information to the input receiver 500 using a keyboard or the like when the user wants to provide a service for accepting submission of a new application form.

The definition data generator 510 reads out the common definition data from the common definition storage 400 through an operation of the CPU 1000. The definition data generator 510 then replaces the ANY element included in the common definition data with an element having the item name received by the input receiver 500 as an element name and having the data type received by the input receiver 500 as a data type attribute. The definition data generator 510 then uses the replaced definition data as a generated new individual definition data, and supplies the generated individual definition data to the definition data manager 520. The definition data manager 520 stores, through an operation of the CPU 1000, the generated individual definition data in the individual definition storage 430 in association with interface IDs allowing identification of the replaced elements. The definition data manager 520 then informs the service requesting devices 320-1 to 320-N of the interface IDs. The interface IDs may be generated by accepting input from a user together with the input of the item name or the like, for example. In addition, duplication-free characters, signatures, or numbers may be generated according to a predetermined rule, and be used as the interface IDs.

Alternatively, the interface IDs may be generated and included in the individual definition data. For example, the definition data generator 510 may generates new individual definition data by replacing the ANY element in the common definition data with an element having a item name as an element name, and then adding identification information of the element to the definition data as a name of namespace. In this case, the definition data manager 520 does not have to inform the service requesting devices 320-1 to 320-N of the interface IDs separately from the individual definition data. If the definition data manager 520 informs the service requesting devices 320-1 to 320-N of the individual definition data, the service requesting devices 320-1 to 320-N are also informed of the interface IDs included therein. In such a case, the service requesting devices 320-1 to 320-N have only to generate service request messages based on the informed individual definition data. In this way, the service requesting devices 320-1 to 320-N can include the interface ID supplied thereto as the name of namespace in the service request message without performing explicit processing regarding the interface ID.

Figure 6:
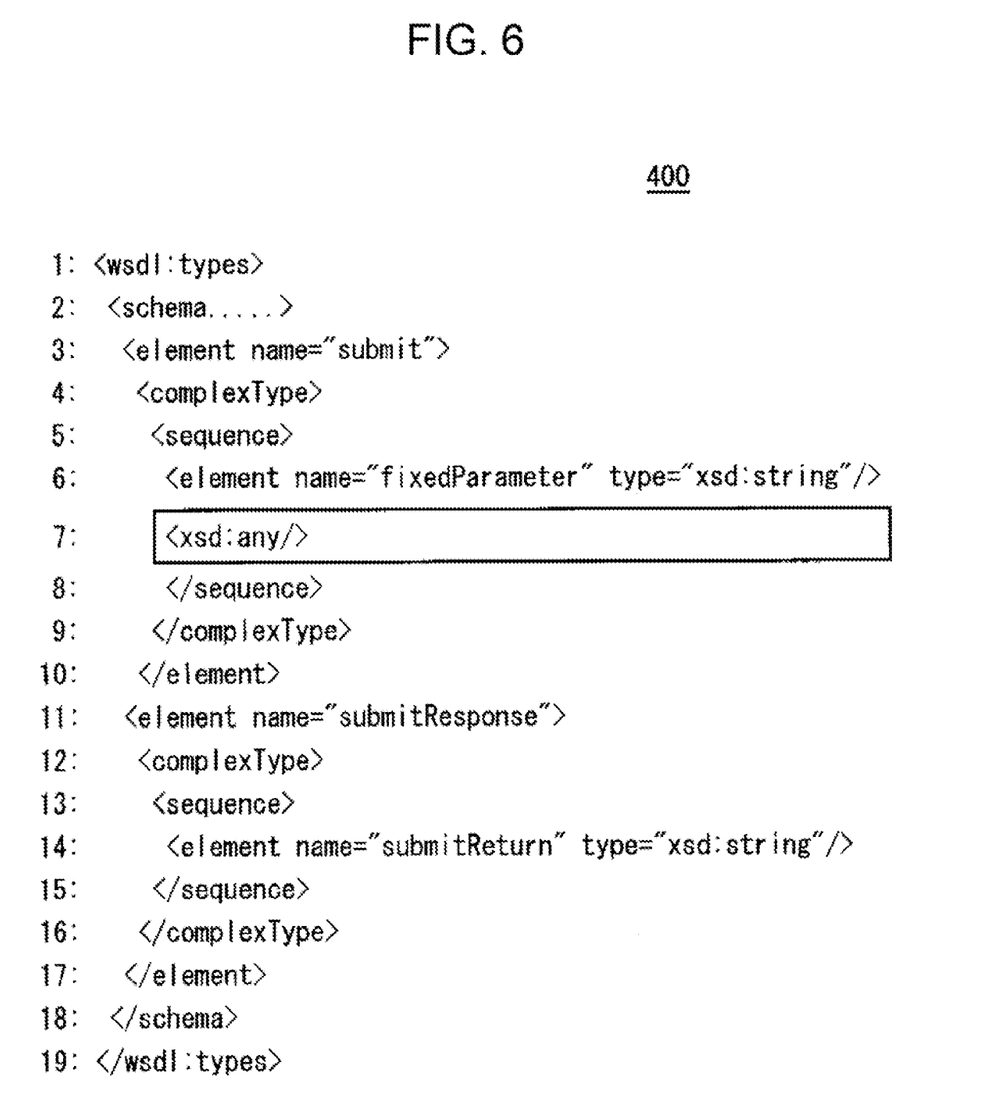
FIG. 6 shows an example of common definition data stored in a common definition storage.

FIG. 6 is an example of common definition data stored in the common definition storage 400. This common definition data is written in WSDL, and contains not only type definition for defining a data structure of input data but also message definition, binding definition, and service definition. FIG. 6 selectively shows type definition among these definitions. In this common definition data, service identification information "submit" is defined at Line 3. At subsequent Lines 4 to 9, a data structure of input data necessary for processing of the service is defined. More specifically, Line 6 indicates that data having an element name "fixedParameter" is a character string type "string". Data at Line 7 is an ANY element, and matches a given number of elements of given data types. Lines 5 and 8 indicate that the elements shown at Lines 6 and 7 are written in this order. More specifically, if the input data for the service "submit" is data that starts with an element of character string type "fixedParameter" followed by a given element, the input data is determined to compliant with the specification.

Lines 11 to 17 show a service having identification information "submitResponse" in contrast. A data structure of input data for this service does not contain an ANY element. Accordingly, only given predefined data, namely, data of character string type having identification name "submitReturn", is permitted as input for this service, and other types of input is determined not to satisfy the specification.

Figure 7:
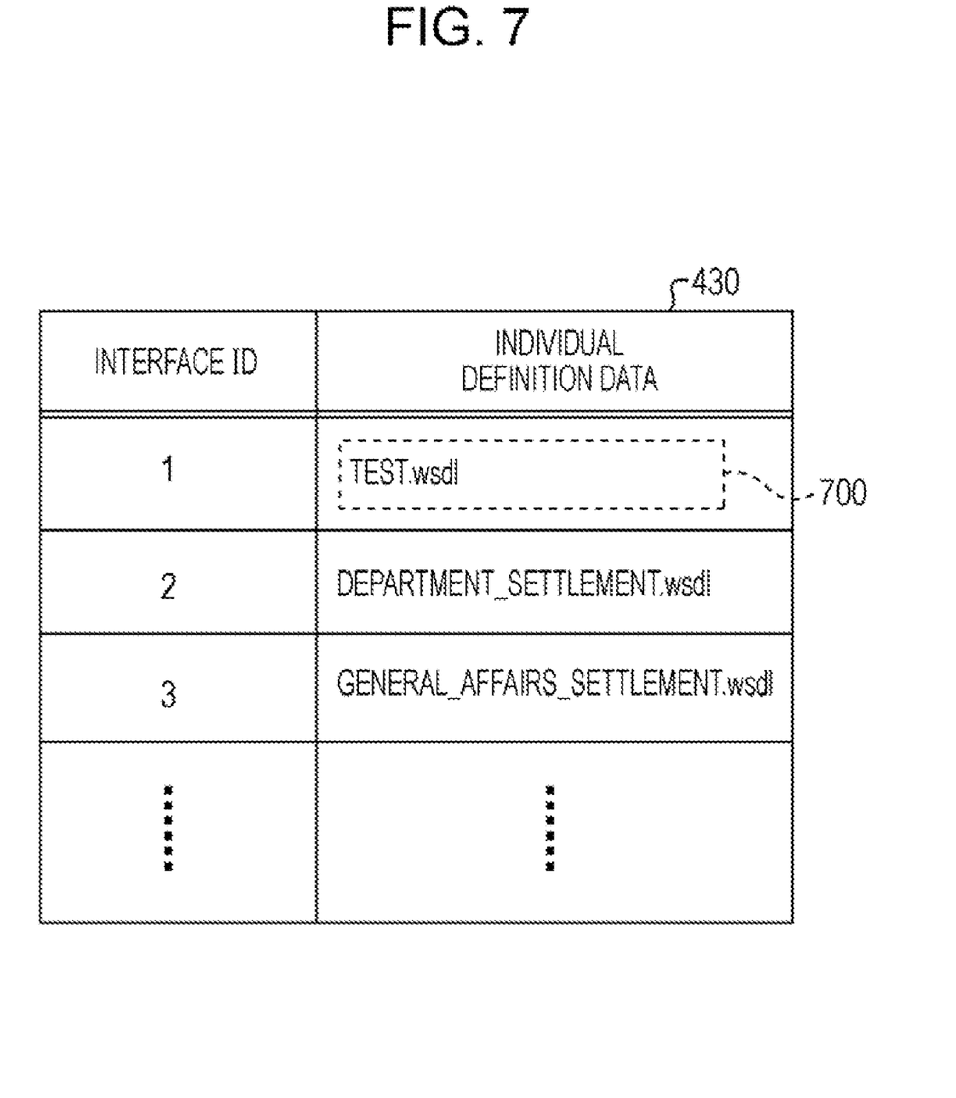
FIG. 7 shows an example of a data structure in an individual definition storage.

FIG. 7 shows an example of a data structure in the individual definition storage 430. The individual definition storage 430 prestores, in association with interface IDs, individual definition data that defines specifications for data structures identified by the interface IDs. The individual definition data is, for example, WSDL files independent from each other, and may be attached with different file names in accordance with its applications and processing contents of the services. For example, individual definition data having an interface ID of 1 is included in a file named "TEST.wsdl". The individual definition data stored in this file is referred to as a test wsdl file 700. The retriever 440 extracts the interface ID from the received service request message, and then retrieves the WSDL file corresponding to the interface ID from the individual definition storage 430. The retriever 440 then reads out the retrieved WSDL file, and outputs the WSDL file to the individual validator 450.

Figure 8:
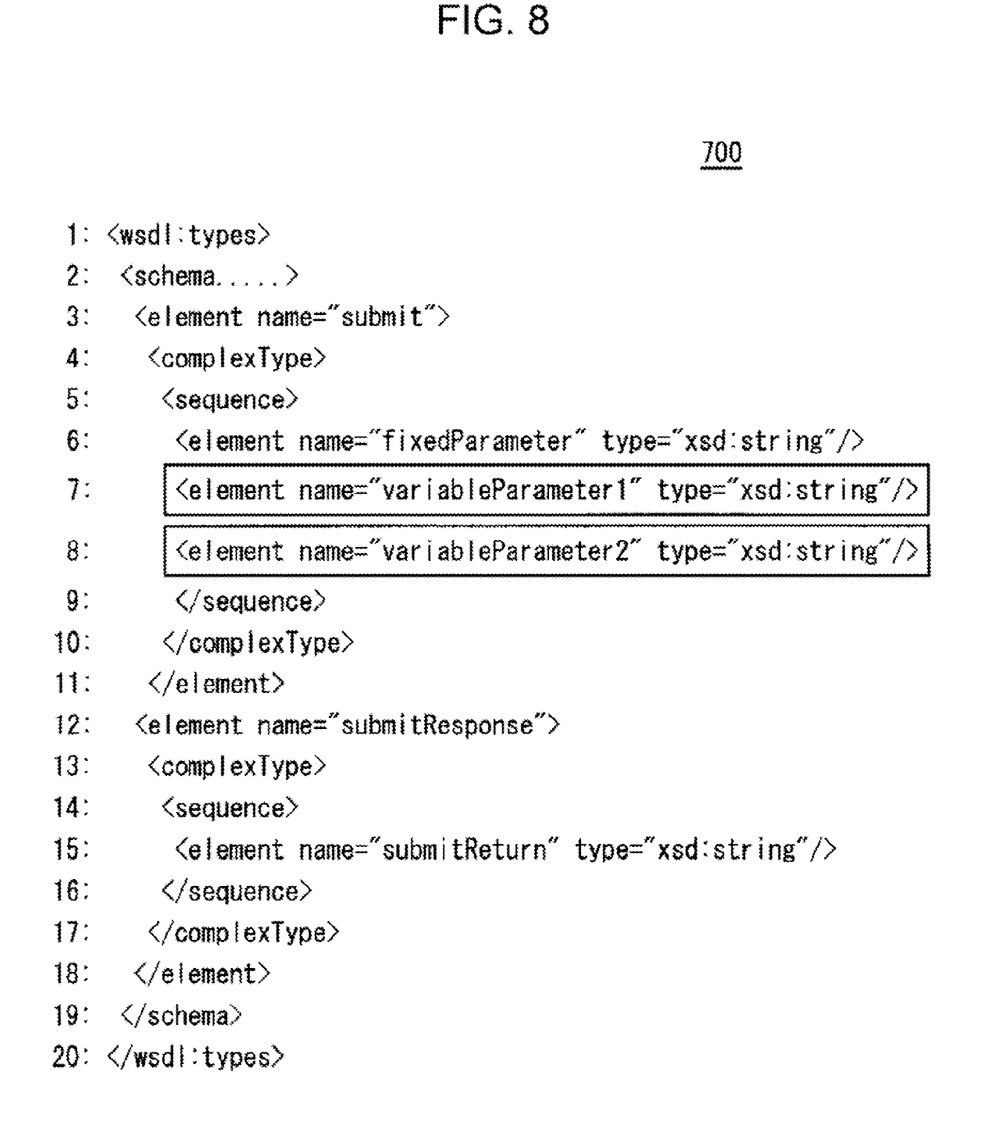
FIG. 8 shows an example of a test WSDL file.

FIG. 8 shows an example of the test wsdl file 700. Like the description of FIG. 6, FIG. 8 selectively shows data type definition from the individual definition data. This individual definition data defines a specification for a data structure to be satisfied by the input data matching the ANY element in the common definition data. The data structure is identified by the interface ID "1" shown in FIG. 7. More specifically, Line 3 in FIG. 8 indicates that an interface for the service "submit" is defined. An entity of the definition is written at Lines 4 to 10. Line 6 indicates that data having an element name "fixedParameter" is a character string type "string". This is the same as the description shown at Line 6 of FIG. 6. More specifically, Line 6 indicates a specification to be certainly satisfied even if the data structure of the input data differs.

In contrast, Lines 7 and 8 define specific element names and data types instead of the ANY element shown in FIG. 6. Line 7 indicates that data having an element name "variableParameter1" is a character string type "string". Line 8 indicates that data having an element name "variableParameter2" is a character string type "string". More specifically, whether each element following "fixedParameter" in the service request message satisfies the specification is not determined by the common validator 420. However, whether each element specifically satisfies the specification is determined by the individual validator 450.

As shown in FIG. 8, the data structures according to an embodiment of the present invention correspond to a concept including not only a data type of one element but also the number of elements in data constituted by a plurality of elements, an identification name of each element, and a data type of each element. The service providing device 30 according to the embodiment permits various kinds of input data as described above for services having the identical identification name, and can selectively execute an appropriate operation in accordance with the data structure.

Figure 9:
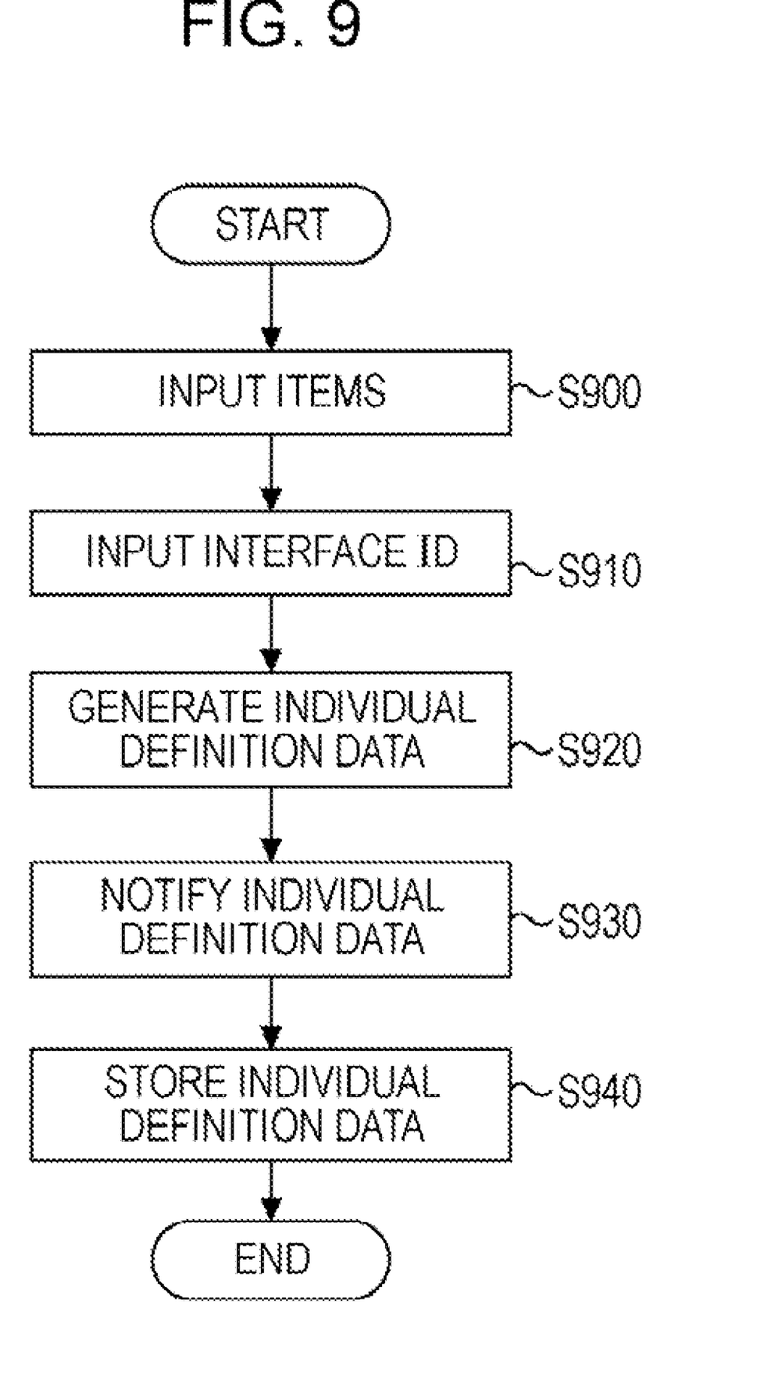
FIG. 9 shows a flow of a process for generating individual definition data in response to input from a user.

FIG. 9 shows a flow of a process for generating individual definition data in response to input from a user. The input receiver 500 displays an input screen to a user, and receives input of an item name and a data type thereof from the user (S900). The input receiver 500 also receives input of an interface ID on the input screen (S910). Referring to FIG. 10, an illustration is given for an input screen for defining an interface of application form data, which is input data, regarding a service for accepting submission of an application form used in workflow management.

FIG. 10 shows an example of an input screen displayed by the input receiver 500. A list of names of input items having been input is displayed at a field "FIELD NAME" on this input screen. Each input item is displayed in association with "COMMENT" for describing the role of the input item, "TYPE" and "CONTAINER TYPE" indicating data types of the item, "ATTRIBUTE" of the item, and information indicating whether or not the input item is subject for validation with WSDL data. As an example, an input item "UserId" indicates identification information of an applicant, and a data type thereof is a text type. The item is also a subject for validation with WSDL data.

Upon a user selecting an input item with a pointing device or the like, matters regarding the input item become editable at "FIELD PROPERTY" shown at a lower part of the screen. More specifically, for example, the input receiver 500 receives a character string input at a field "FIELD NAME" at the FIELD PROPERTY as an item name of the input item.

This item name is used as an element name of an element contained in the input data in the individual definition data. The input receiver 500 then receives a data type input at a field "TYPE" or "CONTAINER TYPE" at the FIELD PROPERTY as a data type of the input item. This data type is used as an attribute value of the element contained in the input data in the individual definition data.

In addition, the input receiver 500 displays an interface ID input field at an upper part of the screen. More specifically, the input receiver 500 receives a character string input at this interface ID input field as an interface ID. This input interface ID may be included in the individual definition data as a name of namespace of the individual definition data. Alternatively, the interface ID may be generated independently from the individual definition data, and may be output, in association with the individual definition data, to the service requesting devices 320-1 to 320-N.

Referring back to FIG. 9, the definition data generator 510 then generates individual definition data on the basis of the item name and the data type having been input (S920). More specifically, the definition data generator 510 first reads out common definition data from the common definition storage 400. The definition data generator 510 then replaces the ANY element contained in the common definition data with an element having the item name received by the input receiver 500 as the element name and having the data type received by the input receiver 500 as the data type attribute. The definition data generator 510 then uses the replaced definition data as new individual definition data.

The definition data manager 520 notifies the service requesting devices 320-1 to 320-N of the generated individual definition data in association with the interface ID allowing identification of the replaced element next (S930). This interface ID corresponds to the one input at the interface ID input field illustrated in FIG. 10, for example. Each of the service requesting devices 320-1 to 320-N informed with the interface ID can include the interface ID in a service request message generated on the basis of the individual definition data corresponding to the interface ID, and can send the service request message to the service providing device 30. The definition data manager 520 stores the generated individual definition data in the individual definition storage 430 in association with the corresponding interface ID (S940).

Figure 11:
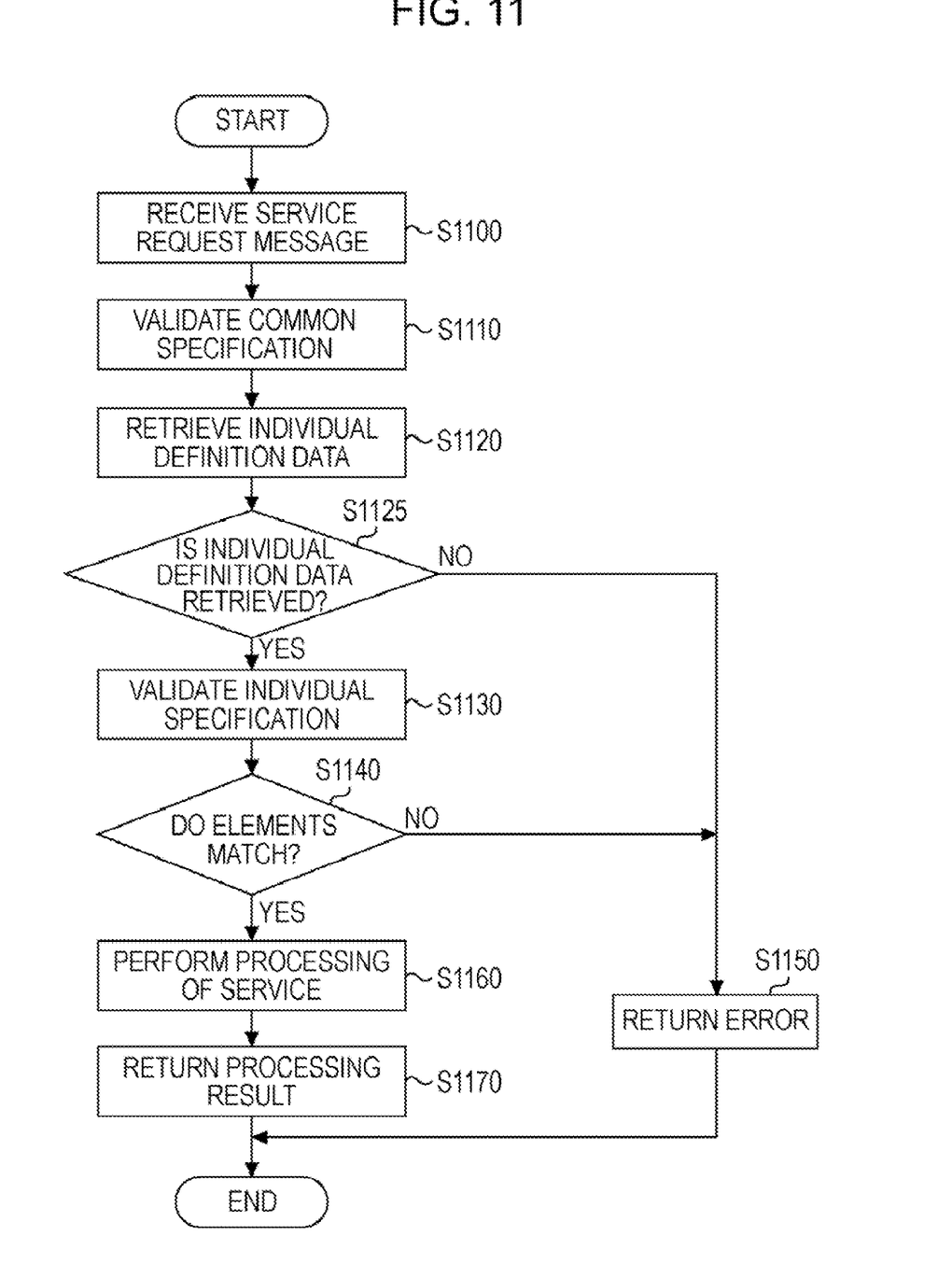
FIG. 11 shows a flow of processing a service in response to reception of a service request message.

FIG. 11 shows a flow of processing a service in response to reception of a service request message. The receiver 410 receives a service request message, which contains input data and an interface ID allowing identification of a data structure of the input data as elements, from the service requesting device 320-1 (S1100). The common validator 420 then validates whether the data structure of the service request message satisfies the specification to be commonly met regardless of the data structure of the input data (S1110). More specifically, the common validator 420 reads out the common definition data from the common definition storage 400, and determines whether each element in the received service request message matches the corresponding element in the common definition data. For example, when a part other than the input data is not compliant with the specification or when the interface ID is not contained, the common validator 420 determines that the specification to be commonly met is not satisfied.

The retriever 440 retrieves and reads out the individual definition data corresponding to the interface ID included in the received service request message from the individual definition storage 430 (S1120). If such individual definition data is not retrieved (S1125:NO), the service processor 460 returns an error notification indicating that the service request message does not satisfy the specification (S1150). If the individual definition data is retrieved (S1125:YES), the individual validator 450 determines whether or not the service request message satisfies the individual definition data (S1130). This validation is performed on the basis of whether or not each element in the service request message matches the corresponding element in the individual definition data.

If each element in the service request message matches the corresponding element in the common definition data and in the individual definition data (S1140:YES), the service processor 460 then performs processing of the service corresponding to the data structure of the input data contained in the service request message (S160). The service processor 460 then returns a processing result of the processing of the service (S1170). On the other hand, if any of elements in the service request message does not match the corresponding element in the common definition data or in the individual definition data (S1140:NO), the service processor 460 returns an error notification indicating the service request message does not compliant with the specification (S1150).

Figure 12:
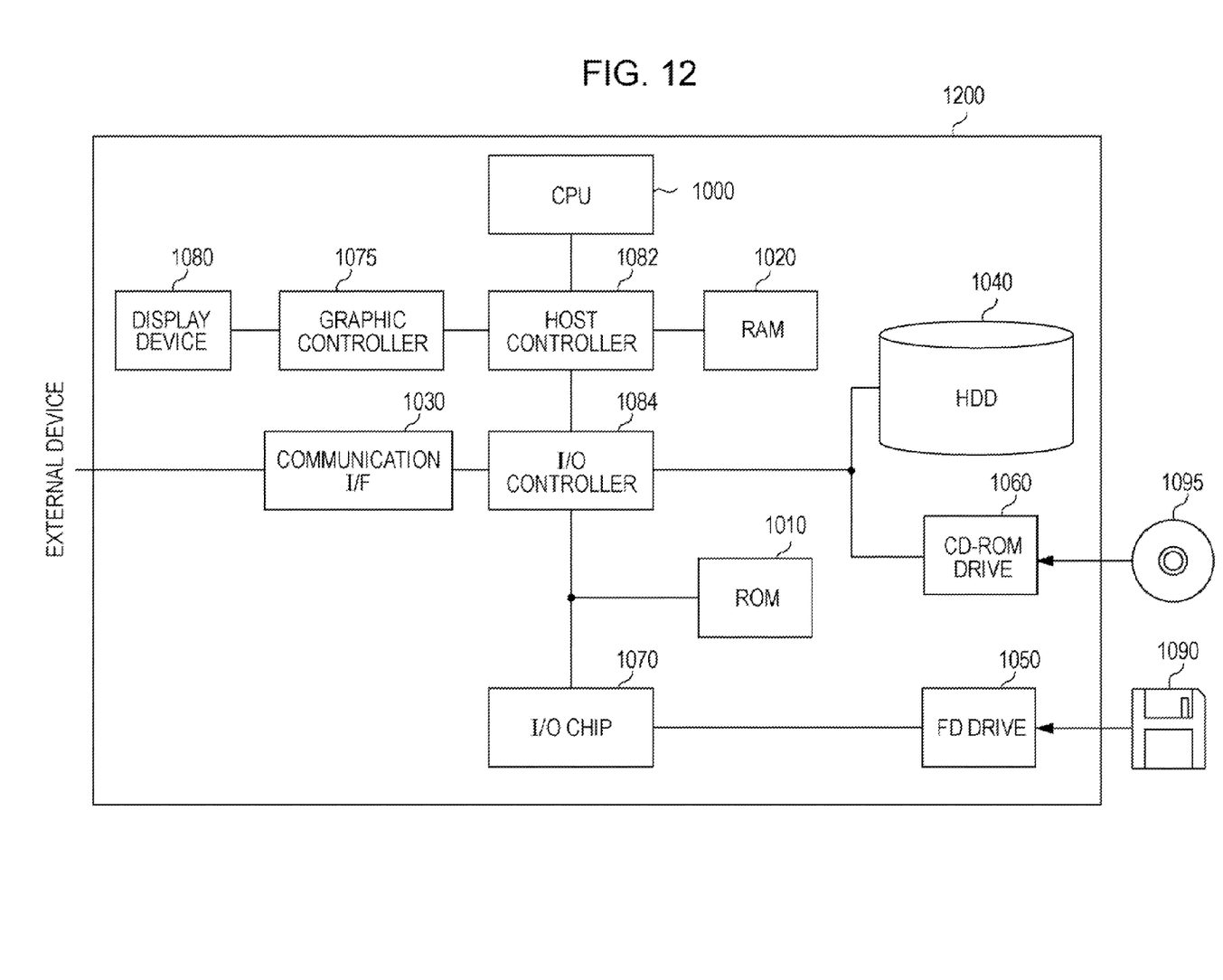
FIG. 12 shows an example of a hardware configuration of an information processing apparatus 1200 that functions as a service providing device.

FIG. 12 shows an example of a hardware configuration of an information processing apparatus 1200 functioning as the service providing device 30. The information processing apparatus 1200 has a CPU (central processing unit) peripheral section, an input/output (I/O) section, and a legacy I/O section. The CPU peripheral section includes a CPU 1000, a RAM (random access memory) 1020, and a graphic controller 1075, which are connected with each other by a host controller 1082. The I/O section includes a communication interface (I/F) 1030, a hard disk drive (HDD) 1040, and a CD-ROM (compact disc-read only memory) drive 1060, which are connected to the host controller 1082 by an I/O controller 1084. The legacy I/O section includes a ROM 1010, a flexible disk drive (FD drive) 1050, and an I/O chip 1070, which are connected to the I/O controller 1084.

The CPU 1000 and the graphic controller 1075 access the RAM 1020 at a high transfer rate. The host controller 1082 interconnects the RAM 1020, the CPU 1000, and the graphic controller 1075. The CPU 1000 operates based on programs stored in the ROM 1010 and the RAM 1020, and controls each part. The graphic controller 1075 acquires image data generated by the CPU 1000 or the like in a frame buffer provided in the RAM 1020, and causes a display device 1080 to display images corresponding to the image data thereon. Instead of this configuration, the graphic controller 1075 may include a frame buffer for storing image data generated by the CPU 1000 or the like therein.

The I/O controller 1084 interconnects the host controller 1082 and relatively high-speed I/O devices, such as the communication interface 1030, the HDD 1040, and the CD-ROM drive 1060. The communication interface 1030 communicates with external devices via a network. The HDD 1040 stores programs and data used by the information processing apparatus 1200. The CD-ROM drive 1060 reads programs or data from a CD-ROM 1095, and supplies the programs or data to the RAM 1020 or the HDD 1040.

The ROM 1010 and relatively low-speed I/O devices, such as the FD drive 1050 and the I/O chip 1070, are connected to the I/O controller 1084. The ROM 1010 stores a boot program executed by the CPU 1000 at the time of booting of the information processing apparatus 1200 and programs that are dependent on the hardware of the information processing apparatus 1200. The FD drive 1050 reads programs or data from a flexible disk 1090, and supplies the programs or data to the RAM 1020 or the HDD 1040 through the I/O chip 1070. The I/O chip 1070 is connected to the flexible disk 1090 and various input/output devices through, for example, a parallel port, a serial port, a keyboard port, or a mouse port, etc.

Programs to be supplied to the information processing apparatus 1200 are stored on a recording medium, such as the flexible disk 1090, the CD-ROM 1095, or an IC (integrated circuit) card, and supplied to the information processing apparatus 1200 by users. The programs are read out from the recording medium through the I/O chip 1070 and/or the I/O controller 1084, and installed and executed in the information processing apparatus 1200. Since operations that the programs cause the information processing apparatus 1200 or the like to execute are the same as those performed by the service providing device 30 described with reference to FIGS. 1 to 11, description thereof is omitted.

The programs described above may be stored on external recording media. The recording media may be not only the flexible disk 1090 or the CD-ROM 1095 but also an optical recording medium such as a DVD (digital versatile disk) or a PD (phase change rewritable disk), a magneto-optical recording medium such as an MD (minidisc), a tape medium, and a semiconductor memory such as an IC card. In addition, the programs may be supplied to the information processing apparatus 1200 via a network using a storage device, such as an HDD or a RAM, provided in a server system connected to a private communication network or the Internet as the recording medium.

As described above, regarding the interface definition in WSDL or the like, the service providing device 30 according to the embodiment can manage a plurality of services that use input data in different data structures with the identical identification name. This allows users requesting services to more efficiently develop application programs utilizing the interface definitions. On the other hand, users providing services does not have to newly add the service providing device 30 and can use the existing service providing device 30 without any modification even if a new service is added. In addition, at the time of development of definition data, a function equivalent to method overloading in existing program languages can be provided. Furthermore, regarding development of new individual definition data necessary for adding a new service, convenience of users can be improved by providing the interface defining unit 310 that allows data input for each input item.

While the present invention has been described using the embodiments of the present invention, the technical scope of the present invention is not limited to the scope described in the above embodiments. It is obvious for those skilled in the art that various modifications or improvements can be added to the above-described embodiments. For example, the service providing device 30 may perform validation using the common definition data and validation using the individual definition data in this order in the message returning processing after processing of the service. More specifically, the common definition data defines specifications to be commonly satisfied regardless of data structures of output data of notification messages. On the other hand, the individual definition data defines specifications to be satisfied by the data structures of the output data of the notification messages. After processing a service, the service providing device 30 generates an output message so that an interface ID allowing identification of the data structure of the output message of the service is contained in the output message. The service providing device 30 then determines whether or not the output message satisfies the common definition data, and determines whether or not the output message satisfies the individual definition data corresponding to the interface ID. If the output message satisfies each specification, the output message is returned to the service requesting device. It is also obvious from the appended claims that such modifications or improvements can be also included within the technical scope of the present invention.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A providing system for receiving a service request message and for providing a web service corresponding to a structure of input data contained in the received service request message comprising:

a directory of web services wherein each web service uses a data input that is different from each other web service and wherein the web services share a common identification name;

a common definition storage for pre-storing common definition data that defines a specification to be commonly satisfied by a data structure of one of the web services regardless of a data structure of the input data contained in the received service request message;

a service request receiver for receiving the received service request message, which contains the input data and an interface identifier allowing identification of the data structure of the input data as elements, using a communication interface;

a common validator for validating, through an operation of a central processing unit, whether or not the received service request message satisfies the specification on a basis of whether or not each element in the received service request message matches a corresponding element in the common definition data;

a hard disk drive including an individual definition storage for pre-storing, in association with the interface identifier, individual definition data that defines a specification for a data structure, identified by the interface identifier, to be satisfied by the input data matching any element in the common definition data that matches any input data in different data structures;

a retriever for retrieving and reading out, through an operation of the central processing unit, individual definition data from the hard disk drive corresponding to the interface identifier contained in the received service request message from the individual definition storage;

an individual validator for determining, through an operation of the central processing unit, that the service request message satisfies the specification or the identified data structure if each element in the received service request message matches a corresponding element in the retrieved individual definition data;

a service processor for performing, through an operation of the central processing unit, processing of the service corresponding to the identified data structure of the input data contained in the service request message if each element in the service request message matches the corresponding element in the common definition data and in the individual definition data;

wherein the providing device is a device for providing Web services, wherein the common definition storage stores data that includes an element of ANY data type or an ANY element in XML (eXtensible Markup Language) and that is written in WSDL (Web Services Description Language) as the common definition data, and wherein the service request receiver receives, as the service request message, a SOAP (Simple Object Access Protocol) message including the interface identifier as an element, and wherein the common validator determines whether or not each element in the service request message matches the corresponding element in the common definition data as a WSDL validation operation, and wherein the individual definition storage pre-stores a plurality of pieces of individual definition data obtained by replacing the element of ANY data type or the ANY element contained in the common definition data with a plurality of elements matching the input data having a different data type or a different identification information, and wherein the individual validator determines whether or not each element in the service request message matches the corresponding element in the individual definition data as the WSDL validation operation.

2. The providing system of claim 1, wherein the service request receiver receives a name of a namespace set within the SOAP message as the interface identifier.

3. The providing system of claim 2, further comprising:

an input receiver for receiving, for each input item included in the input data, input of an item name of the input item and a data type of the input item from a user through an input/output device;

a definition data generator for generating, through an operation of the central processing unit, new individual definition data by reading out the common definition data from the common definition storage, replacing the ANY element contained in the common definition data with an element having the item name received by the input receiver as an element name and having the data type received by the input receiver as a data type attribute, and adding the identification information of the replaced element as the name of namespace; and a definition data manager for storing, through an operation of the central processing unit, the generated individual definition data in the individual definition storage, and for informing a requesting device for requesting a service of the generated individual definition data.

4. The providing system of claim 1, further comprising:

an input receiver for receiving, for each input item included in the input data, input of an item name of the input item and a data type of the input item from a user through an input/output device;

a definition data generator for generating, through an operation of the central processing unit, new individual definition data by reading out the common definition data from the common definition storage, and replacing the ANY element contained in the common definition data with an element having the item name received by the input receiver as an element name and having the data type received by the input receiver as a data type attribute; and a definition data manager for storing, through an operation of the central processing unit, the generated individual definition data in the individual definition storage in association with an interface identifier allowing identification of the replaced element, and for informing a requesting device for requesting a service of the interface identifier.

* * * * *